United States Patent Office.

LEONARD H. BOOLE, OF NEW YORK, N. Y.

Letters Patent No. 68,834, dated September 17, 1867.

---

IMPROVEMENT IN PRESERVING EGGS.

---

The Schedule referred to in these Letters Patent and making part of the same.

---

TO ALL WHOM IT MAY CONCERN:

Be it known that I, LEONARD H. BOOLE, of the city, county, and State of New York, have invented a new and useful Improvement in the Art of Preserving and Compressing Eggs; and I do hereby declare that the following is a full and exact description thereof, reference being had to the accompanying drawings, forming a part of this specification, in which—

Figure I represents the desiccating apparatus, and

Figure II the compressing apparatus, $a$ being the blower, $b$ the deflector of the blast, $c$ the plate on which the egg is placed, $d$ the press, and $e\ e\ e$ the moulds.

My invention consists, first, in expelling the water and gases contained in fresh eggs, and secondly, in reducing the eggs to a solid state and compact form by means of compression. This is accomplished without in the least injuring the quality of the eggs, so that at any time, by adding pure cold, lukewarm, or warm water, the compressed egg is returned to its natural state, retaining all its desired qualities, and can be used in the same manner and for the same purposes as fresh-beaten eggs.

In order to impart a correct understanding of the *rationale* of my process, it may be proper to set forth the constituent elements of the eggs of chickens, as ascertained by the most authoritative analysis. The eggs of other domestic fowls do not vary in their chemical constituents in a degree sufficient to affect the appropriateness of this process.

The white or albumen contains, water, 85; pure albumen, 12; mucus, 2.7; saline matter, 0.3, including soda, with traces of sulphur. The yolk contains, water, 41.486; a form of albumen called vitelline, 15.76; margarine and oleine, 21.304; cholesterine, 0.438; oleic and margaric acids, 7.226; phospho-glycerine acid, 1.2; muriate of ammonia, 0.034; chlorides of sodium and potassium and sulphate of potassa, 0.277; phosphates of lime and magnesia, 1.022; animal extracts, 0.4; coloring matter, 0.553; traces of iron, lactic acids, &c.

It will be seen by this analysis that the oily substances constitute more than one-eighth of the entire egg, viz, margarine and oleine 21.304, oleic and margaric acids 7.226. With these the tendency to rancidity is greatly increased after the egg has been submitted to the action of heated air, as in the various modes of desiccating eggs heretofore practised, to which practice in fact may be attributed the unpleasant odor of all the eggs heretofore prepared by desiccation.

The principal element of decomposition in the egg is water. By removing this, without raising the temperature so as to affect the oily matter, then reducing the mass to such a state of compactness as to exclude the air, the process of preservation is complete, for the adhesive tendency of the various parts causes them readily to unite under pressure, thus forming a solid that will resist the action of the atmosphere, but easily return to its normal state by the absorption of water. It may be remarked, however, that in this process certain volatile elements are of course expelled, the presence of which, even in the freshest eggs, is offensive; and in this respect eggs treated by my process are regarded by persons of delicate taste as more desirable than those consumed directly from the shell.

My mode of operation is as follows: The fresh-beaten egg is spread upon a smooth surface of metal, wood, glass, or porcelain, in such a manner as to be brought in contact with and exposed to a powerful blast of pure air, supplied by means of any suitable blower or blast-wheel, driven by any suitable machinery. By this process most of the water is expelled. The egg is then placed in moulds, of sufficient capacity to contain one or more eggs each, and subjected to a pressure sufficient to expel all the moisture remaining, leaving the egg in a solid and compressed form, corresponding to the size and form of the moulds.

By this process the eggs are greatly reduced in bulk and weight, rendering their transportation safe and convenient, and, as the moisture is completely exhausted, they cannot be affected by the action of any climate, but will remain fresh and sweet for any length of time.

My manner of compressing eggs can be applied equally as well to the yolk separated from the white or albumen, or to the white or albumen separated from the yolk, as to both combined.

Having thus described my invention, what I claim, and desire to secure by Letters Patent, is—

1. The process of preserving eggs by desiccation and compression, substantially as herein described.
2. As an article of manufacture, eggs desiccated without heat, substantially as described.
3. As an article of manufacture, eggs desiccated and compressed, substantially as herein described.

L. H. BOOLE.

Witnesses:
   T. C. CONNOLLY,
   GEORGE A. NOLEN.